United States Patent
Lin et al.

(10) Patent No.: US 8,847,500 B2
(45) Date of Patent: Sep. 30, 2014

(54) LED DRIVER AND DRIVING METHOD

(75) Inventors: Shui-Mu Lin, Taichung County (TW); Chueh-Kuei Jan, Hsinchu County (TW); Shei-Chie Yang, Taichung County (TW); Huan-Chien Yang, Pingtung County (TW)

(73) Assignee: Richtek Technology Corp., Hsinchu (TW)

( * ) Notice: Subject to any disclaimer, the term of this patent is extended or adjusted under 35 U.S.C. 154(b) by 221 days.

(21) Appl. No.: 12/955,094

(22) Filed: Nov. 29, 2010

(65) Prior Publication Data

US 2011/0127923 A1 Jun. 2, 2011

(30) Foreign Application Priority Data

Dec. 1, 2009 (TW) .............................. 98140964 A (51) Int. Cl.
*H05B 37/02* (2006.01)
*H05B 33/08* (2006.01)

(52) U.S. Cl.
CPC ........... *H05B 33/0815* (2013.01); *Y02B 20/347* (2013.01); *H05B 33/0824* (2013.01); *H05B 33/0818* (2013.01)
USPC ............ 315/193; 315/291; 315/294; 315/297

(58) Field of Classification Search
USPC .......................................... 315/291, 193, 246
See application file for complete search history.

(56) References Cited

U.S. PATENT DOCUMENTS

| | | | |
|---|---|---|---|
| 6,822,403 B2 * | 11/2004 | Horiuchi et al. | 315/307 |
| 7,843,150 B2 * | 11/2010 | Wang et al. | 315/307 |
| 7,940,014 B2 * | 5/2011 | Shin et al. | 315/294 |
| 7,999,487 B2 * | 8/2011 | Szczeszynski | 315/291 |
| 8,111,006 B2 * | 2/2012 | Komiya et al. | 315/291 |
| 8,159,140 B2 * | 4/2012 | Takata et al. | 315/185 R |
| 2010/0328370 A1 * | 12/2010 | Takata et al. | 345/694 |

* cited by examiner

*Primary Examiner* — Tung X Le
*Assistant Examiner* — Jonathan Cooper
(74) *Attorney, Agent, or Firm* — Muncy, Geissler, Olds & Lowe, P.C.

(57) ABSTRACT

An LED driver includes a power converter to convert an input voltage to a regulated voltage, a current source to be connected with an LED string in series between the power converter and a bias node, and a switching circuit to apply a bias voltage to the bias node to set the total voltage drop of the LED string and the current source. By controlling the total voltage drop of the LED string and the current source, the LED driver will automatically select a boost mode or a buck mode for operation, thereby improving the efficiency thereof.

26 Claims, 7 Drawing Sheets

LED DRIVER AND DRIVING METHOD

FIELD OF THE INVENTION

The present invention is related generally to a light emitting diode (LED) driver and, more particularly, to a circuit and method to improve the efficiency of an LED driver.

BACKGROUND OF THE INVENTION

Figure 1:
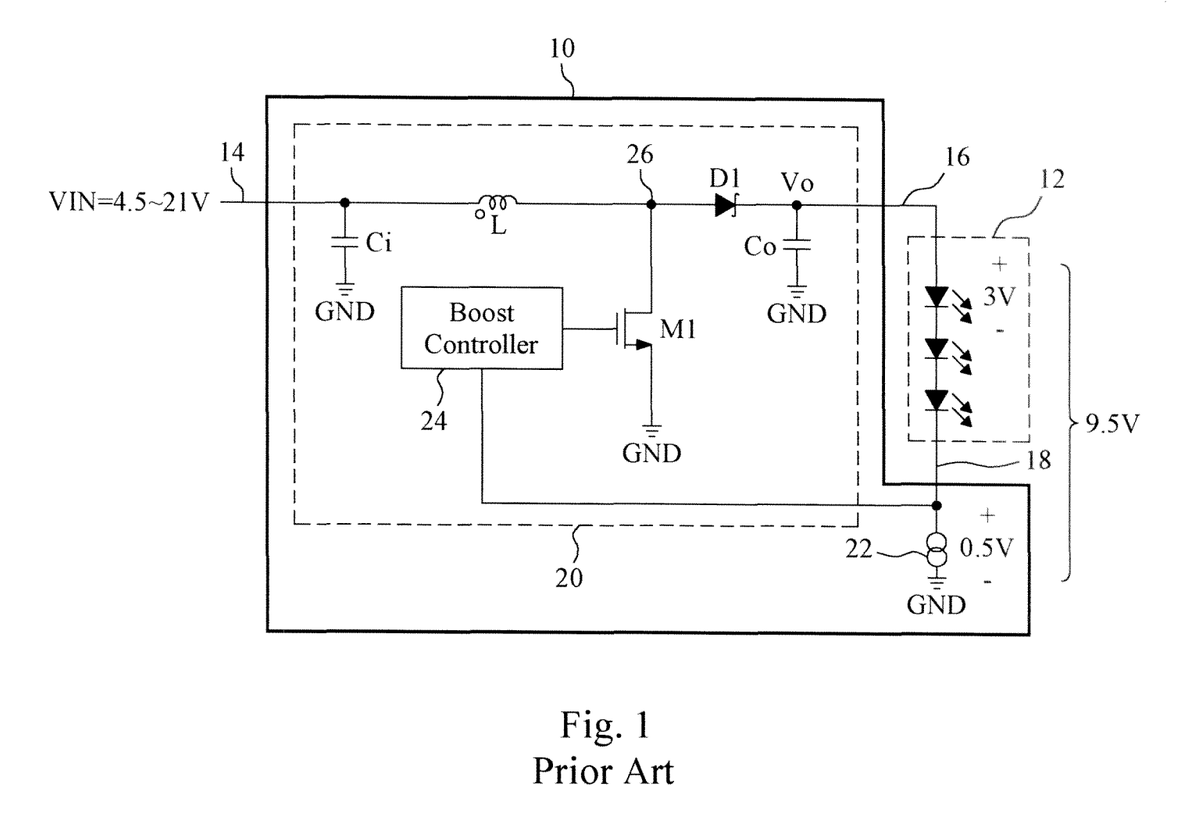
FIG. 1 is a circuit diagram of a conventional boost type LED driver.

As shown in FIG. 1, a conventional boost type LED driver 10 has an input terminal 14 to receive an input voltage VIN, and a pair of output terminals 16 and 18 for an LED string 12 to be connected therebetween. In this boost type LED driver 10, an asynchronous boost converter 20 steps up the input voltage VIN to a regulated voltage Vo to apply to the LED string 12, and a current source 22 is to be serially connected with the LED string 12 to set the driving current and thereby the brightness of the LED string 12. In the asynchronous boost converter 20, an input capacitor Ci is connected to the input terminal 14 to stabilize the input voltage VIN, an inductor L is connected between the input terminal 14 and a switching node 26, a diode D1 is connected between the switching node 26 and the output terminal 16, an output capacitor Co is connected to the output terminal 16 to stabilize the output voltage Vo, a MOS M1 is connected between the switching node 26 and a ground terminal GND, and a boost controller 24 switches the MOS M1 to regulate the output voltage Vo. During the on-time of the MOS M1, the inductor L is charged by the voltage source VIN, and during the off-time of the MOS M1, the inductor L releases energy to the output capacitor Co.

In FIG. 1, the LED string 12 includes three LEDs connected in series. If each of the LEDs requires a driving voltage of 3V and the current source 22 requires a driving voltage of 0.5V, the boost type LED driver 10 has to provide the output voltage Vo of 9.5V in order to drive the LED string 12. When the input voltage VIN is lower than 9.5V, for example 4.5V, the boost converter 20 will step up the input voltage VIN to the output voltage Vo of 9.5V. In this case, the boost type LED driver 10 operates in a boost mode and thus has a higher efficiency. However, since the conventional boost type LED driver 10 lacks of a buck mode for operation, when the input voltage VIN is higher than 9.5V, for example 21V, the boost converter 20 will stay idle and the MOS M1 will remain on, so the output voltage Vo will be approximately equal to the input voltage VIN, and the boost type LED driver 10 enters a low dropout (LDO) mode. In this case, the LED string 12 consumes only 9V and the left 12V of the power source is completely allotted to the current source 22. Therefore, most of power is consumed by the current source 22, leading the efficiency of the boost type LED driver 10 to be degraded, lower to about (9.5/21)×100%.

Figure 2:
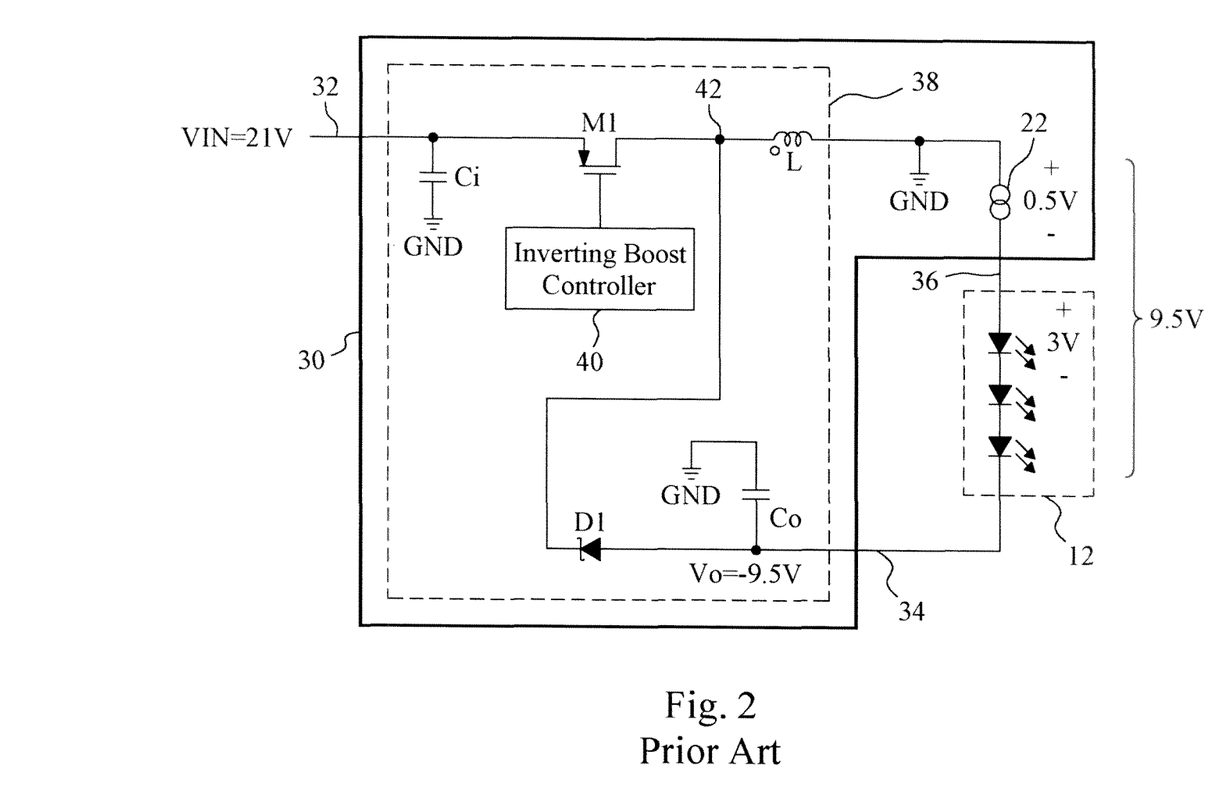
FIG. 2 is a circuit diagram of a conventional inverting boost type LED driver operating in a buck mode.

As shown in FIG. 2, a conventional inverting boost type LED driver 30 includes an input terminal 32 to receive an input voltage VIN, and a pair of output terminals 34 and 36 for an LED string 12 to be connected therebetween. In addition to the current source 22 to set the driving current of the LED string 12, this inverting boost type LED driver 30 includes an asynchronous inverting boost converter 38 to step up the input voltage VIN to a regulated voltage Vo having an opposite polarity to that of the input voltage VIN. In the asynchronous inverting boost converter 38, an input capacitor Ci is connected to the input terminal 32 to stabilize the input voltage VIN, a MOS M1 is connected between the input terminal 32 and a switching node 42, an inductor L is connected between the switching node 42 and a ground terminal GND, a diode D1 is connected between the switching node 42 and the output terminal 34 to prevent a reverse current from the switching node 42 to the output terminal 34, an output capacitor Co is connected to the output terminal 34 to stabilize the output voltage Vo, and an inverting boost controller 40 switches the MOS M1 to regulate the output voltage Vo.

In FIG. 2, the LED string 12 includes three LEDs connected in series. If each of the LEDs requires a driving voltage of 3V and the current source 22 requires a driving voltage of 0.5V, the inverting boost type converter 38 will be designed to provide the output voltage Vo of −9.5V. In the case that the input voltage VIN is 21V, the inverting boost type LED driver 30 will step down the input voltage VIN of 21V to an output voltage of 9.5V for the LED string 12. In other words, the inverting boost type LED driver 30 acts as operating in a buck mode.

Figure 3:
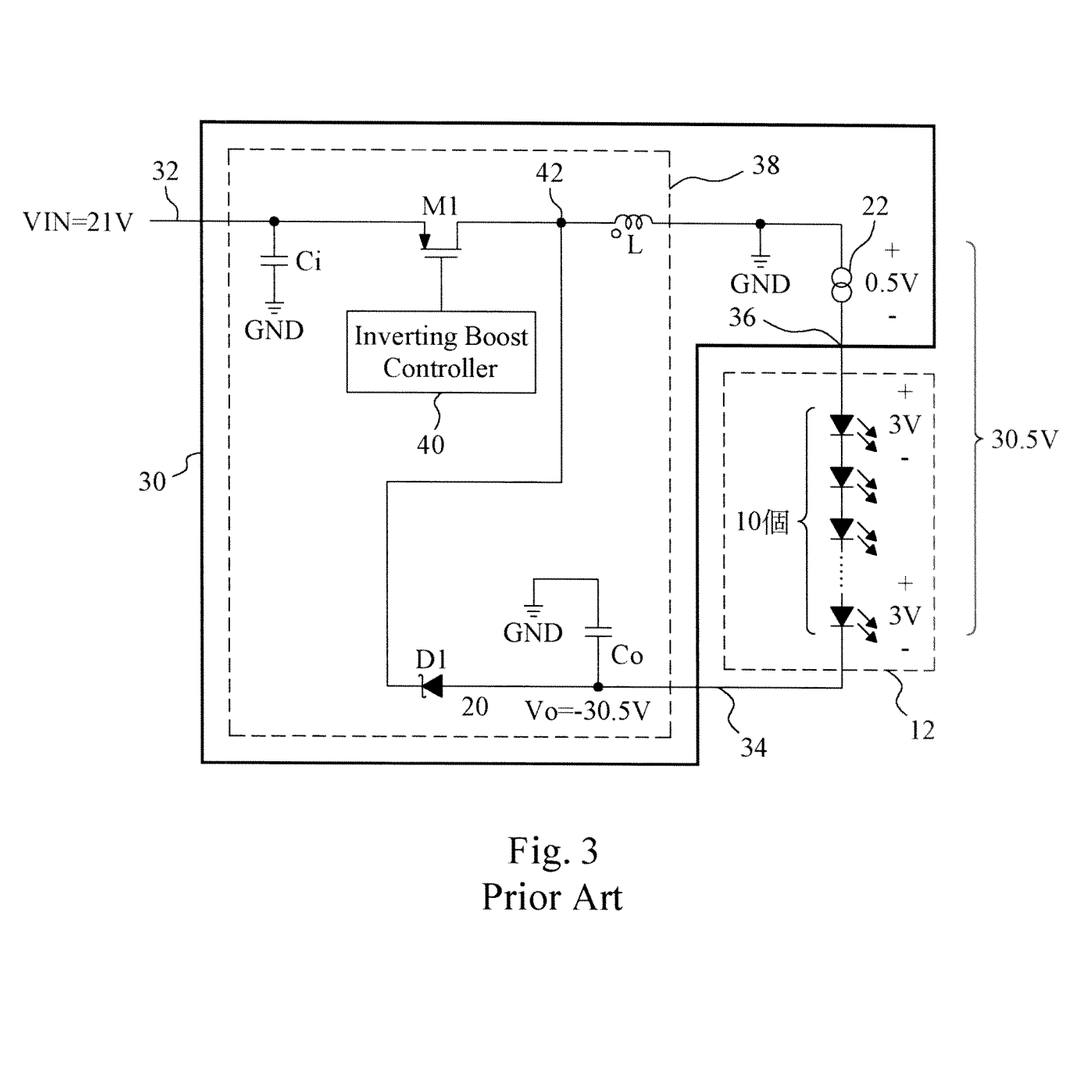
FIG. 3 is a circuit diagram of the inverting boost type LED driver of FIG. 2 operating in a boost mode.

FIG. 3 is a circuit diagram of the inverting boost type LED driver 30 operating in a boost mode. If the input voltage VIN is 21V and the LED string 12 includes ten LEDs, at least 30.5V is required for driving the LED string 12. In this case, the inverting boost type converter 38 provides the output voltage Vo of −30.5V, and the inverting boost type LED driver 30 acts as stepping up the input voltage VIN of 21V to an output voltage of 30.5V for the LED string 12. Therefore, the MOS M1 suffers a voltage drop of about 51.5V (=21−(−30.5)), and thus must be a high-voltage element able to sustain 51.5V. This requires higher cost for hardware. In addition, the higher the voltage drop of the MOS M1 is, the greater the current flowing through the MOS M1 and the inductor L is. As a result, the on resistance of the MOS M1 and the parasitic resistance of the inductor L cause higher power consumption, leading the efficiency of the inverting boost type LED driver 30 to be lower. Moreover, the output voltage Vo and the operation mode of the inverting boost type converter 38 are set by the design of the inverting boost converter 38, and can not be changed any longer once the circuit design of the inverting boost converter 38 is completed.

SUMMARY OF THE INVENTION

An object of the present invention is to provide an LED driver and driving method.

Another object of the present invention is to provide an LED driver and driving method with automatic mode selection capability.

A still object of the present invention is to provide a boost type LED driver and driving method supporting buck mode operation.

A further object of the present invention is to provide an inverting boost type LED driver and driving method supporting buck mode operation.

A still further object of the present invention is to provide a high efficiency LED driver and driving method.

According to the present invention, an LED driver includes a power converter to convert an input voltage to a regulated voltage, a current source to be connected with an LED string in series between the power converter and a bias node, and a switching circuit to apply a bias voltage to the bias node.

According to the present invention, an LED driving method converts an input voltage to a regulated voltage for an LED string, connects a current source serially to the LED string, and applies a bias voltage to set the total voltage drop of the LED string and the current source.

By controlling the total voltage drop of the LED string and the current source, the LED driver will automatically select to operate with a boost mode or a buck mode, thereby improving the efficiency thereof.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 4:
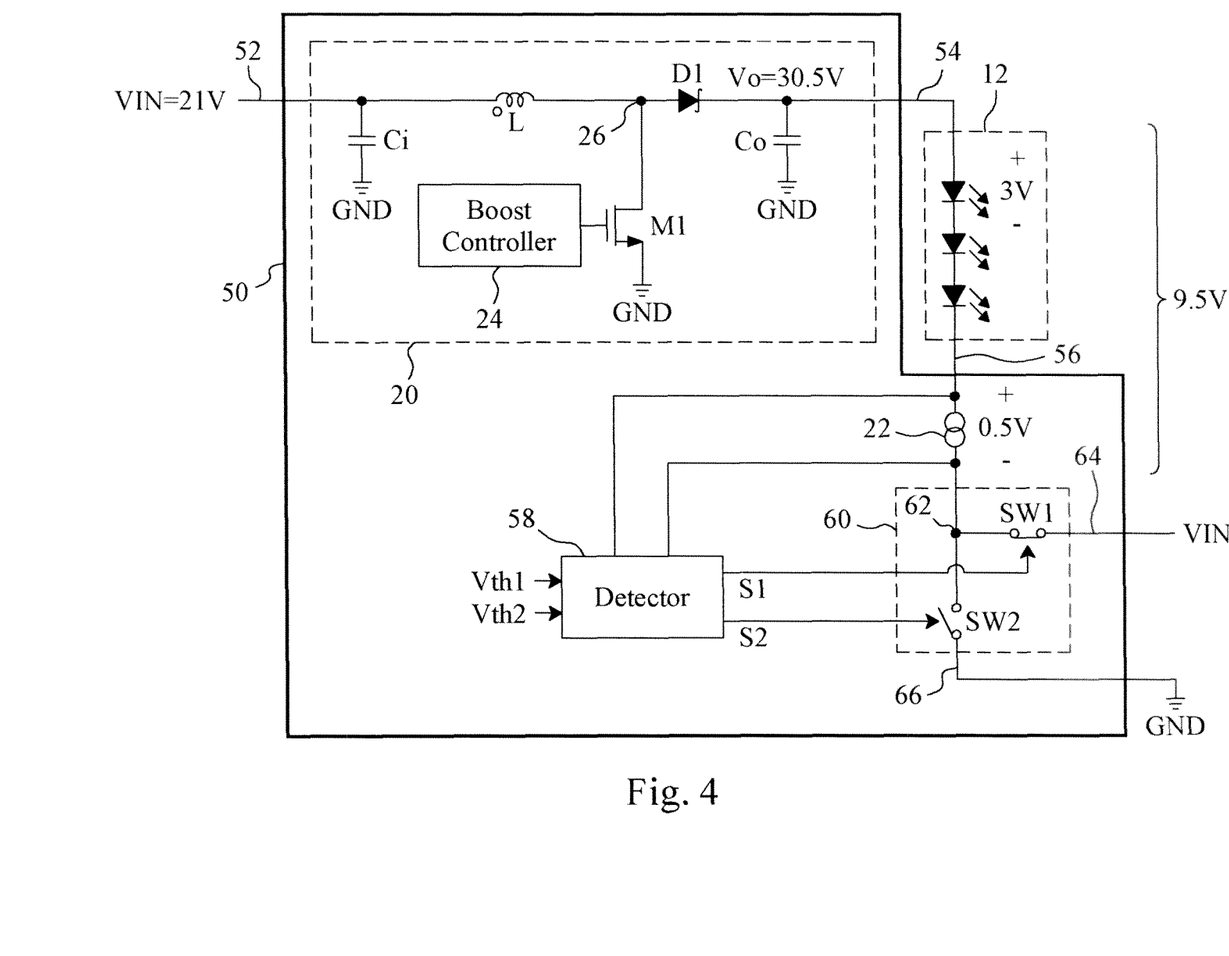
FIG. 4 is a circuit diagram of a boost type LED driver according to the present invention operating in a buck mode.

According to the present invention, as shown in FIG. 4, a boost type LED driver 50 has an input terminal 52 to receive an input voltage VIN, and a pair of output terminals 54 and 56 for an LED string 12 to be connected therebetween. For example, the LED string 12 includes three serially connected LEDs and the input voltage VIN is 21V. The boost type LED driver 50 also includes an asynchronous boost converter 20 and a current source 22. In this embodiment, the asynchronous boost converter 20 converts the input voltage VIN to an output voltage Vo of 30.5V. The boost type LED driver 50 further includes a detector 58 and a switching circuit 60. The switching circuit 60 is arranged in the current path established by the LED string 12 and the current source 22, and has bias terminals 64 and 66 to receive different supplied voltages, respectively, a switch SW1 connected between the current source 22 and the bias terminal 64, and a switch SW2 connected between the current source 22 and the bias terminal 66. Each of the bias terminals 64 and 66 may receive a voltage inside the boost type LED driver 50 or a user defined voltage outside of the boost type LED driver 50. In this embodiment, the bias terminal 64 receives the input voltage VIN and the bias terminal 66 is grounded. The detector 58 is connected to the current source 22 to detect its voltage drop and generate select signals S1 and S2 accordingly to control the switches SW1 and SW2, respectively. Along the same current path, the position of the current source 22 is changeable. For instance, it may be alternatively placed between the output terminal 54 and the asynchronous boost converter 20.

Figure 5:
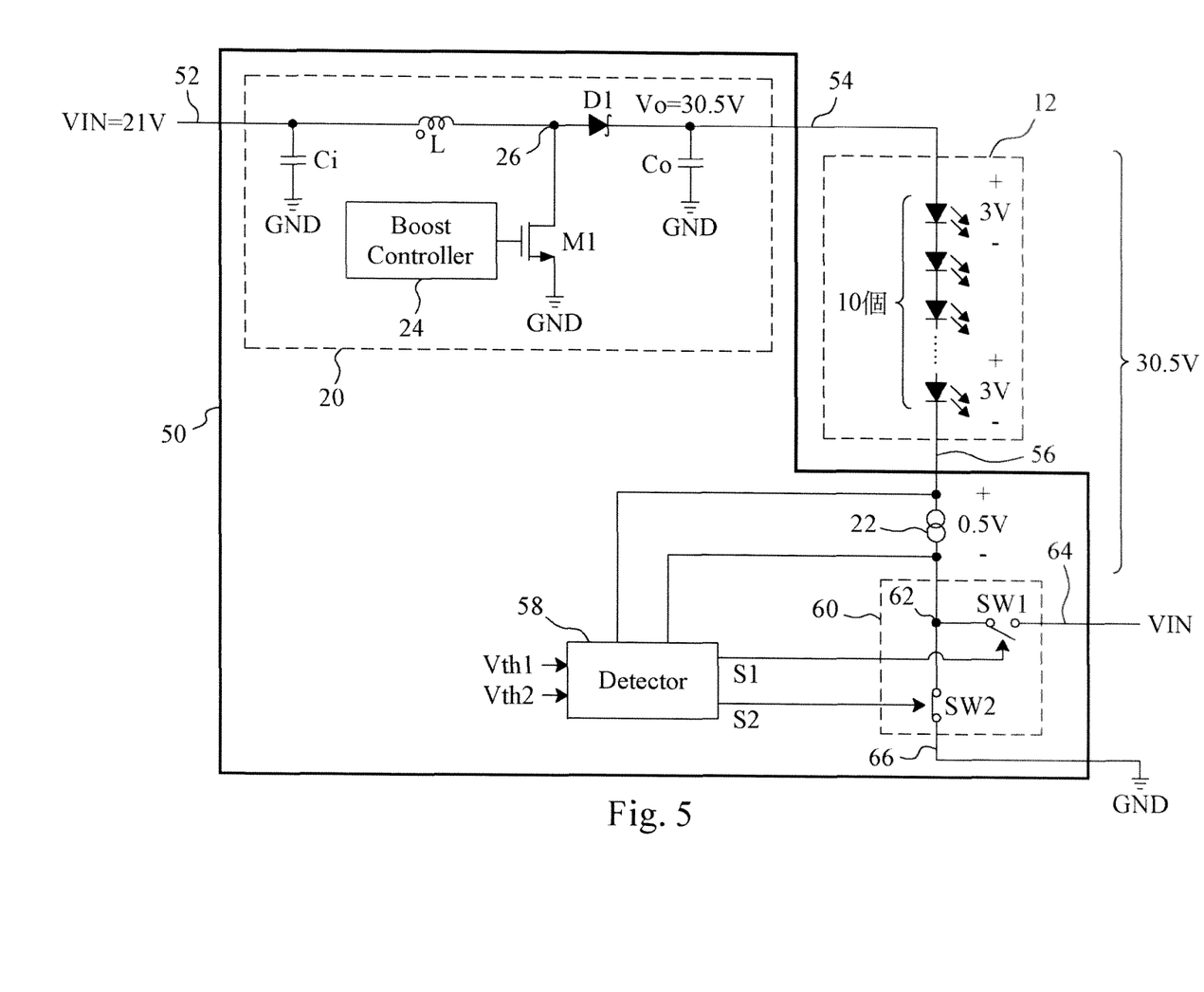
FIG. 5 is a circuit diagram of the boost type LED driver of FIG. 4 operating in a boost mode.

In FIG. 4, the LED string 12 has only three serially connected LEDs. If each of the LEDs requires a driving voltage of 3V and the current source 22 requires a driving voltage of 0.5V, the boost type LED driver 50 has to provide the output voltage Vo of 9.5V in order to drive the LED string 12, for which the switch SW1 is turned on and the switch SW2 is turned off, to connect the current source 22 to the bias terminal 64. Therefore, the voltage between the output terminal 54 and the bias node 62 is equal to Vo−VIN=30.5−21=9.5V. In this case, the boost type LED driver 50 acts as stepping down the input voltage VIN of 21V to an output voltage of 9.5V to drive the LED string 12. In other words, the boost type LED driver 50 operates in a buck mode and has higher efficiency. When the number of LEDs in the LED string 12 is increased, for example, to ten, 30.5V will be required to drive the LED string 12. If the switching circuit 60 connects the current source 22 to the bias terminal 64, the boost type LED driver 50 will not provide a sufficient voltage, causing the voltage drop of the current source 22 decreased. When the voltage drop of the current source 22 becomes lower than a first threshold Vth1, the detector 58 will change the select signals S1 and S2 to switch the switches SW1 and SW2 such that the switching circuit 60 connects the current source 22 to the bias terminal 66, as shown in FIG. 5. Therefore, the voltage between the output terminal 54 and the bias node 62 is equal to Vo−0=30.5V. In this case, the boost type LED driver 50 acts as stepping up the input voltage VIN of 21V to an output voltage of 30.5V to drive the LED string 12. In other words, the boost type LED driver 50 operates in a boost mode and keeps a high efficiency. When the number of LEDs in the LED string 12 is decreased from ten to three, the voltage drop of the current source 22 will increase. In this case, although the LED string 12 can still be driven, the current source 22 consumes most of the power and degrades the efficiency of the boost type LED driver 50. Thus, when the voltage drop of the current source 22 becomes higher than a second threshold Vth2, the detector 58 will change the select signals S1 and S2 to switch the switches SW1 and SW2 such that the switching circuit 60 connects the current source 22 to the bias terminal 64, as shown in FIG. 4. As a result, the boost type LED driver 50 switches back to the buck mode from the boost mode, thereby remaining the high efficiency operation.

Figure 6:
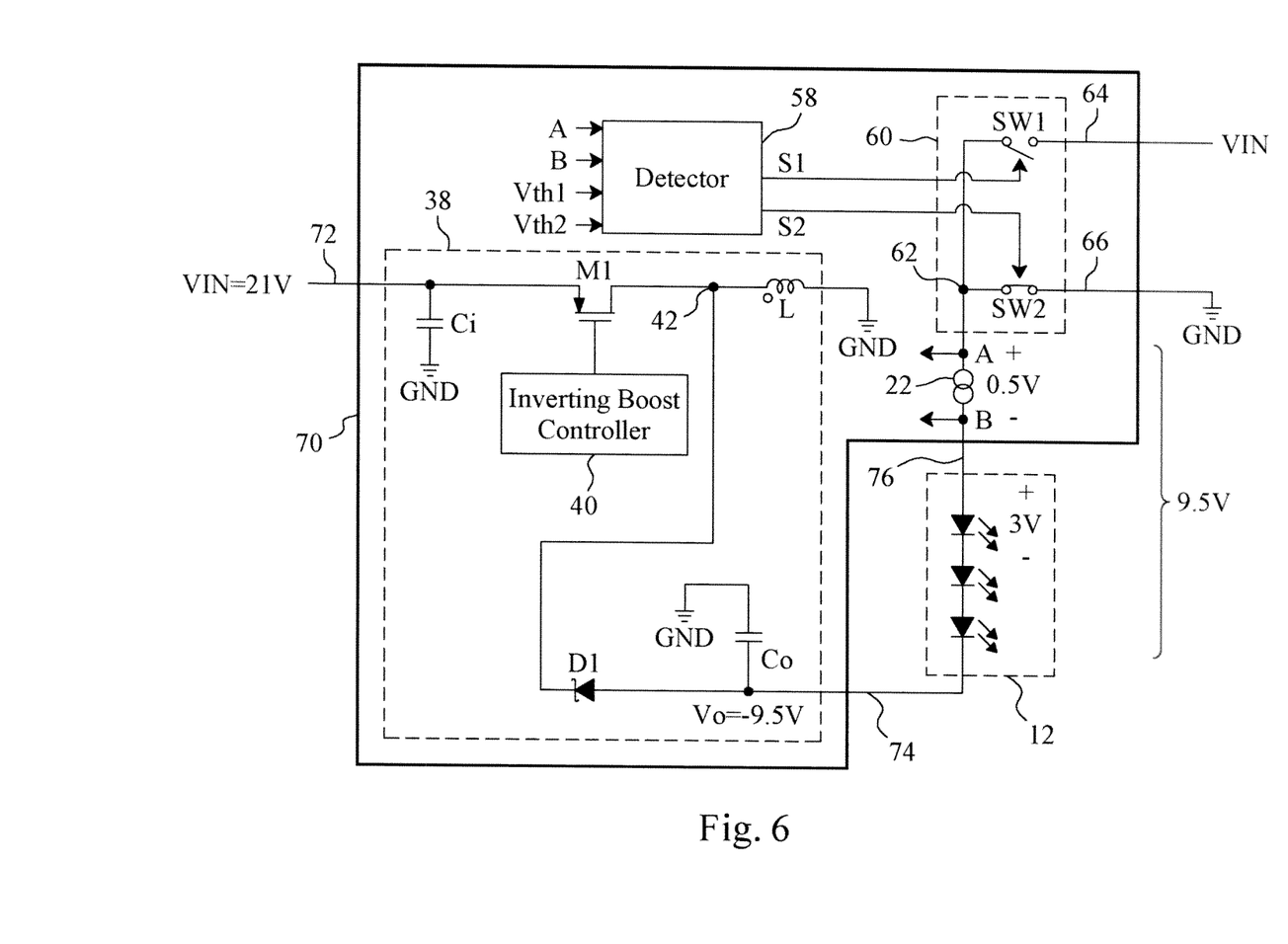
FIG. 6 is a circuit diagram of an inverting boost type LED driver according to the present invention operating in a buck mode.

According to the present invention, as shown in FIG. 6, an inverting boost type LED driver 70 has an input terminal 72 to receive an input voltage VIN and a pair of output terminals 74 and 76 for an LED string 12 to be connected therebetween. For example, the LED string 12 includes three serially connected LEDs and the input voltage VIN is 21V. The inverting boost type LED driver 70 includes a detector 58 and a switching circuit 60 in addition to the asynchronous inverting boost converter 38 and the current source 22. In this embodiment, the asynchronous inverting boost converter 38 converts the input voltage VIN to an output voltage Vo of −9.5V. In the inverting boost type LED driver 70, the switching circuit 60 is arranged in the current path established by the LED string 12 and the current source 22, and has bias terminals 64 and 66 to receive different supplied voltages, respectively, a switch SW1 connected between the current source 22 and the bias terminal 64, and a switch SW2 connected between the current source 22 and the bias terminal 66. Each of the bias terminals 64 and 66 may receive a voltage inside the inverting boost type LED driver 70 or a user defined voltage outside of the inverting boost type LED driver 70. In this embodiment, the bias terminal 64 receives the input voltage VIN and the bias terminal 66 is grounded. Along the same current path, the position of the current source 22 is changeable. For instance, it may be alternatively placed between the output terminal 74 and the asynchronous inverting boost converter 38.

Figure 7:
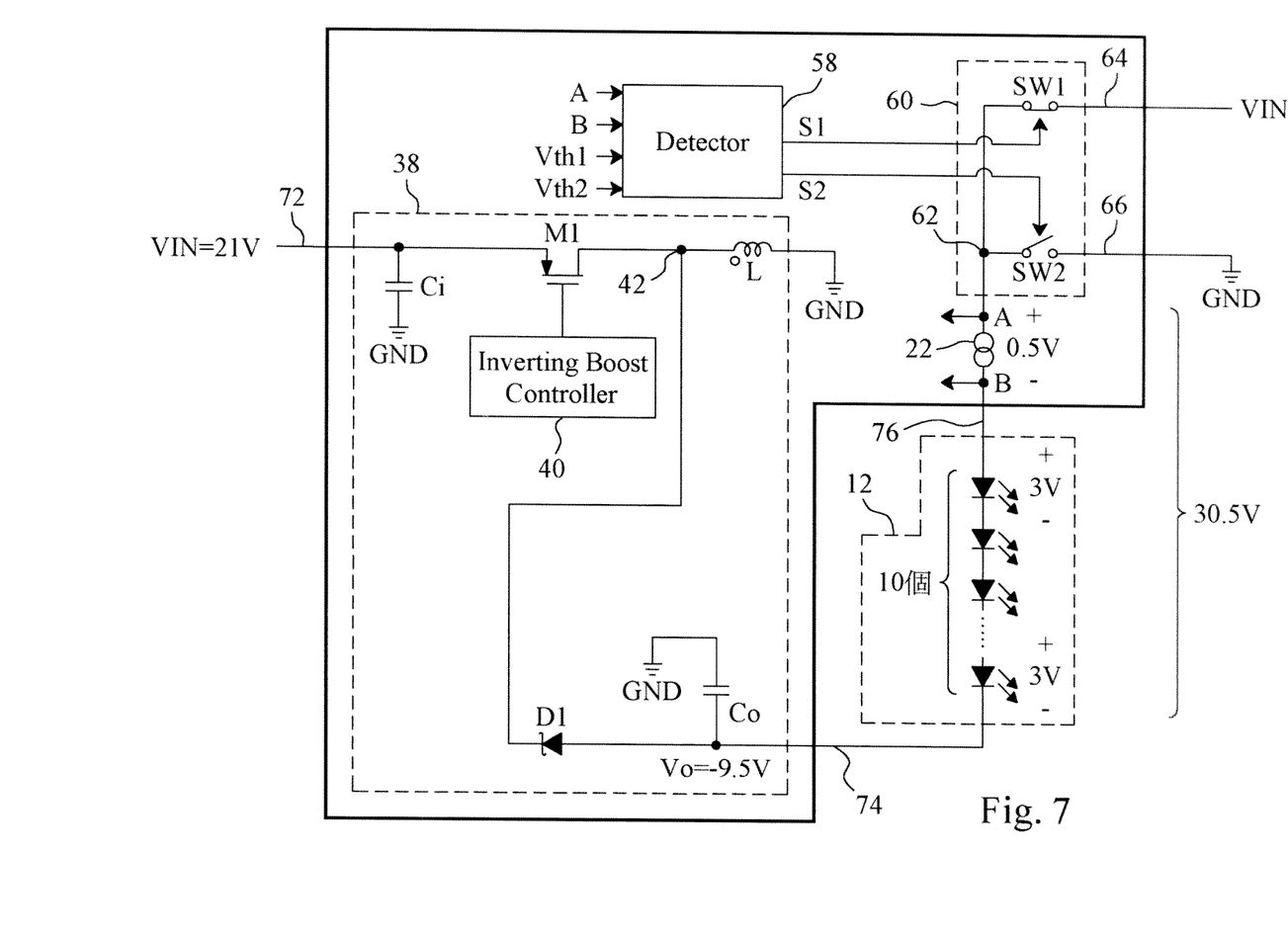
FIG. 7 is a circuit diagram of the inverting boost type LED driver of FIG. 6 operating in a boost mode.

In FIG. 6, the LED string 12 includes three serially connected LEDs, and thus the inverting boost type LED driver 70 has to provide the output voltage Vo of 9.5V in order to drive the LED string 12. Therefore, the detector 58 controls the switches SW1 and SW2 such that the switching circuit 60 connects the current source 22 to the bias terminal 66, so the voltage between the bias node A and the output terminal 74 is equal to 0−(−9.5)=9.5V. In this case, the inverting boost type LED driver 70 acts as stepping down the input voltage VIN of 21V to an output voltage of 9.5V to drive the LED string 12. In other words, the boost type LED driver 70 operates in a buck mode and has a higher efficiency. When the number of LEDs in the LED string 12 is increased, for example, to ten, 30.5V will be required to drive the LED string 12, and the inverting boost type LED driver 70 can not provide a sufficient voltage, causing the voltage drop of the current source 22 decreased. When the voltage drop of the current source 22 becomes lower than a first threshold Vth1, the detector 58 will change the select signals S1 and S2 to switch the switches SW1 and SW2 such that the switching circuit 60 connects the current source 22 to the bias terminal 64, as shown in FIG. 7. Therefore, the voltage between the bias node A and the output terminal 74 is equal to 21−(−9.5)=30.5V, being sufficient to drive the ten serially connected LEDs. In this case, the inverting boost type LED driver 70 acts as stepping up the input voltage VIN of 21V to an output voltage of 30.5V to drive the LED string 12. In other words, the inverting boost type LED driver 70 operates in a boost mode and keeps the high efficiency. When the number of LEDs in the LED string 12 is decreased from ten to three, the voltage drop of the current source 22 will increase. Once the voltage drop of the current source 22 becomes higher than a second threshold Vth2, the detector 58 will change the select signals S1 and S2 to switch the switches SW1 and SW2 such that the switching circuit 60 connects the current source 22 to the bias terminal 66, as shown in FIG. 6, and thus the inverting boost type LED driver 70 switches back to the buck mode from the boost mode, thereby remaining the high efficiency operation.

By comparing the circuits of FIG. 3 and FIG. 7, it is noted that while they both convert the input voltage VIN of 21V to the output voltage Vo of 30.5V, the MOS M1 in the inverting boost type LED driver 70 sustains only 30.5V and is not necessary to be a high-voltage element capable of enduring up to 51.5V, thereby saving costs. Furthermore, the voltage drop of the MOS M1 in the inverting boost type LED driver 70 is only 30.5V, the current flowing through the MOS M1 and the inductor L is smaller, thereby ensuring the inverting boost type LED driver 70 with better efficiency.

In the foregoing embodiments, by changing the voltages applied to the bias terminals 64 and 66 to have values between the input voltage VIN and a ground voltage, or to have an opposite polarity to that of the input voltage VIN, or by adding bias terminals to receive more different voltages, the switching circuit 60 may apply different or more supplied voltages to the bias node 62, and thus allow the total voltage drop of the LED string 12 and the current source 22 to be different or to have more selections. Therefore, although the boost type LED driver 50 and the inverting boost type LED driver 70 are fixed in circuit architecture during the design stage, they still have high flexibility in applications.

Alternatively, the asynchronous boost converter 20 may be replaced by a synchronous boost converter, and the asynchronous inverting boost converter 38 may be replaced by a synchronous inverting boost converter. For example, a power switch may be used to replace the diode D1 and is switched by the boost controller 24 or the inverting boost controller 40. Asynchronous boost converters, synchronous boost converters, asynchronous inverting boost converters, and synchronous inverting boost converters are all well known.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An LED driver comprising:
    a first output terminal and a second output terminal for an LED string connected therebetween;
    a power converter for converting an input voltage to a regulated voltage;
    a switching circuit connected to a bias node for applying a bias voltage thereto;
    a current source connected to the first output terminal or the second output terminal such that the current source and the LED string will be connected in series, with the combination of the current source and the LED string connected between the power converter and the bias node; and
    a detector connected to the current source and the switching circuit for detecting a voltage drop of the current source to control the switching circuit to select one of a plurality of supplied voltages as the bias voltage to apply to the bias node;
    wherein the bias voltage sets a total voltage drop of the combination of the current source and the LED string.

2. The LED driver of claim 1, wherein the bias voltage has a value such that the LED driver operates in a buck mode.

3. The LED driver of claim 1, wherein the bias voltage has a value such that the LED driver operates in a boost mode.

4. The LED driver of claim 1, wherein the power converter comprises an asynchronous boost converter.

5. The LED driver of claim 1, wherein the power converter comprises an asynchronous inverting boost converter.

6. The LED driver of claim 1, wherein the power converter comprises a synchronous boost converter.

7. The LED driver of claim 1, wherein the power converter comprises a synchronous inverting boost converter.

8. The LED driver of claim 1, wherein the switching circuit comprises:
    a plurality of bias terminals for receiving different supplied voltages, respectively; and
    a plurality of switches, each of which is connected between the bias node and a respective one of the plurality of bias terminals.

9. The LED driver of claim 1, wherein the bias voltage is user determinable.

10. The LED driver of claim 1, wherein the current source is connected between the power converter and the first output terminal.

11. The LED driver of claim 1, wherein the current source is connected between the second output terminal and the bias node.

12. The LED driver of claim 1, wherein the plurality of supplied voltages comprise one substantially equal to the input voltage.

13. The LED driver of claim 1, wherein the plurality of supplied voltages comprise one substantially equal to a ground voltage.

14. The LED driver of claim 1, wherein the plurality of supplied voltages comprise one having a value between the input voltage and a ground voltage.

15. The LED driver of claim 1, wherein the plurality of supplied voltages comprise one having an opposite polarity to that of the input voltage.

16. An LED driving method for driving an LED string, comprising the steps of:
    A.) converting an input voltage to a regulated voltage to apply to the LED string;
    B.) serially connecting a current source to the LED string;
    C.) detecting a voltage drop of the current source;
    D.) selecting one of a plurality of supplied voltages as a bias voltage according to the voltage drop of the current source; and E.) applying the bias voltage to a combination of the LED string and the current source to set a total voltage drop of the combination of the LED string and the current source.

17. The LED driving method of claim 16, wherein the step A comprises the step of boosting the input voltage to generate the regulated voltage.

18. The LED driving method of claim 16, wherein the step A comprises the step of inversely boosting the input voltage to generate the regulated voltage.

19. The LED driving method of claim 16, wherein the bias voltage is user determinable.

20. The LED driving method of claim 16, wherein the total voltage drop is smaller than the input voltage.

21. The LED driving method of claim 16, wherein the total voltage drop is greater than the input voltage.

22. The LED driving method of claim 16, further comprising the step of selecting one of a plurality of supplied voltages as the bias voltage.

23. The LED driving method of claim 22, wherein the plurality of supplied voltages comprise one substantially equal to the input voltage.

24. The LED driving method of claim 22, wherein the plurality of supplied voltages comprise one substantially equal to a ground voltage.

25. The LED driving method of claim 22, wherein the plurality of supplied voltages comprise one having a value between the input voltage and a ground voltage.

26. The LED driving method of claim 22, wherein the plurality of supplied voltages comprise one having an opposite polarity to that of the input voltage.

\* \* \* \* \*